United States Patent
Okuno et al.

(10) Patent No.: US 12,085,160 B2
(45) Date of Patent: Sep. 10, 2024

(54) GEAR MEMBER

(71) Applicants: SUMITOMO ELECTRIC SINTERED ALLOY, LTD., Okayama (JP); HONDA MOTOR CO., LTD., Tokyo (JP)

(72) Inventors: Reiko Okuno, Okayama (JP); Shinichi Hirono, Okayama (JP); Toshiyuki Kosuge, Okayama (JP); Heisuke Kobayashi, Saitama (JP); Shinya Kurihara, Tokyo (JP); Katsuhiko Yazama, Tokyo (JP)

(73) Assignees: SUMITOMO ELECTRIC SINTERED ALLOY, LTD., Okayama (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/754,827

(22) PCT Filed: Sep. 25, 2020

(86) PCT No.: PCT/JP2020/036460
§ 371 (c)(1),
(2) Date: Apr. 13, 2022

(87) PCT Pub. No.: WO2021/079685
PCT Pub. Date: Apr. 29, 2021

(65) Prior Publication Data
US 2024/0060555 A1    Feb. 22, 2024

(30) Foreign Application Priority Data
Oct. 23, 2019 (JP) ................. 2019-192626

(51) Int. Cl.
*F16H 55/08* (2006.01)

(52) U.S. Cl.
CPC ................. *F16H 55/0806* (2013.01)

(58) Field of Classification Search
CPC .................................................. F16H 55/0806
USPC .................................................. 74/457, 460
See application file for complete search history.

(56) References Cited

U.S. PATENT DOCUMENTS

| | | | | |
|---|---|---|---|---|
| 2,462,924 A * | 3/1949 | Ungar | ........... | F04C 2/084 418/201.3 |
| 4,614,484 A * | 9/1986 | Riegler | ........... | F04C 18/084 418/201.3 |
| 4,754,661 A * | 7/1988 | Barnett | ........... | F16H 48/28 475/236 |
| 5,911,780 A * | 6/1999 | Hamasaka | ........... | C21D 7/06 29/90.7 |
| 6,893,239 B2 * | 5/2005 | Pippes | ........... | F04C 2/102 418/171 |

(Continued)

FOREIGN PATENT DOCUMENTS

| | | |
|---|---|---|
| CN | 103821905 | 5/2014 |
| JP | S55-090847 U | 6/1980 |

(Continued)

*Primary Examiner* — Ha Dinh Ho
(74) *Attorney, Agent, or Firm* — IPUSA, PLLC

(57) ABSTRACT

[Means for Solution] A gear member includes a tooth having a tooth flank whose profile is an involute curve, wherein in a cross-section of the tooth perpendicular to a face width direction, the tooth has a depression, near a top land, hollowed in the tooth flank relative to the involute curve.

8 Claims, 6 Drawing Sheets

(56) References Cited

U.S. PATENT DOCUMENTS

| | | | | |
|---|---|---|---|---|
| 8,201,471 | B2 * | 6/2012 | Ohmi | F16H 55/0886 |
| | | | | 74/462 |
| 8,827,668 | B2 * | 9/2014 | Giuseppe | F04C 2/16 |
| | | | | 418/201.3 |
| 9,005,038 | B2 * | 4/2015 | Nabeshima | F16C 3/035 |
| | | | | 403/359.6 |
| 9,358,621 | B2 * | 6/2016 | Sagstrom | B23C 3/28 |
| 10,352,365 | B2 * | 7/2019 | Hiraoka | F16D 3/2245 |
| 2017/0252844 | A1 | 9/2017 | Hirono et al. | |

FOREIGN PATENT DOCUMENTS

| | | |
|---|---|---|
| JP | 2005-299895 | 10/2005 |
| JP | 2010-180918 | 8/2010 |
| WO | 2016/031500 | 3/2016 |

* cited by examiner

US 12,085,160 B2

GEAR MEMBER

TECHNICAL FIELD

The disclosures herein relate to gear members.

The present application is based on and claims priority to Japanese patent application No. 2019-192626 filed on Oct. 23, 2019, and the entire contents of the Japanese patent application are hereby incorporated by reference.

BACKGROUND ART

Patent Document 1 discloses a planetary carrier comprised of a plurality of plates with holes through which a shaft engaging with a sun gear extends. Patent Document 1 further discloses a flange plate which is one of the plurality of plates and which includes a plate and a boss. The boss of the flange plate has a substantially cylindrical shape, and is formed integrally with the plate around the hole thereof. The outer perimeter surface of the boss has teeth formed thereon that are capable of engaging another member. As disclosed in Patent Document 2, planetary carriers formed as a sintered member are widely used.

RELATED-ART DOCUMENTS

Patent Document

[Patent Document 1] Japanese Laid-open Patent Publication No. 2005-299895
[Patent Document 2] International Publication Pamphlet No. WO2016/031500

SUMMARY OF THE INVENTION

A first gear member according to the present disclosures includes
  a tooth having a tooth surface whose profile is an involute curve,
  wherein in a cross-section of the tooth perpendicular to a face width direction,
  the tooth has a depression, near a top land, hollowed in the tooth surface relative to the involute curve.
A second gear member according to the present disclosures includes
  a tooth having a tooth surface whose profile is an involute curve,
  wherein the tooth has a second edge which is further inside in a tooth thickness direction than a first edge that is imaginary and constituted by the involute curve and a surface extension of a top land,
  wherein the top land is a processed surface that has been machined, and
  wherein the tooth surface is an unprocessed surface that has not been machined.

MODE FOR CARRYING OUT THE INVENTION

Figure 1:
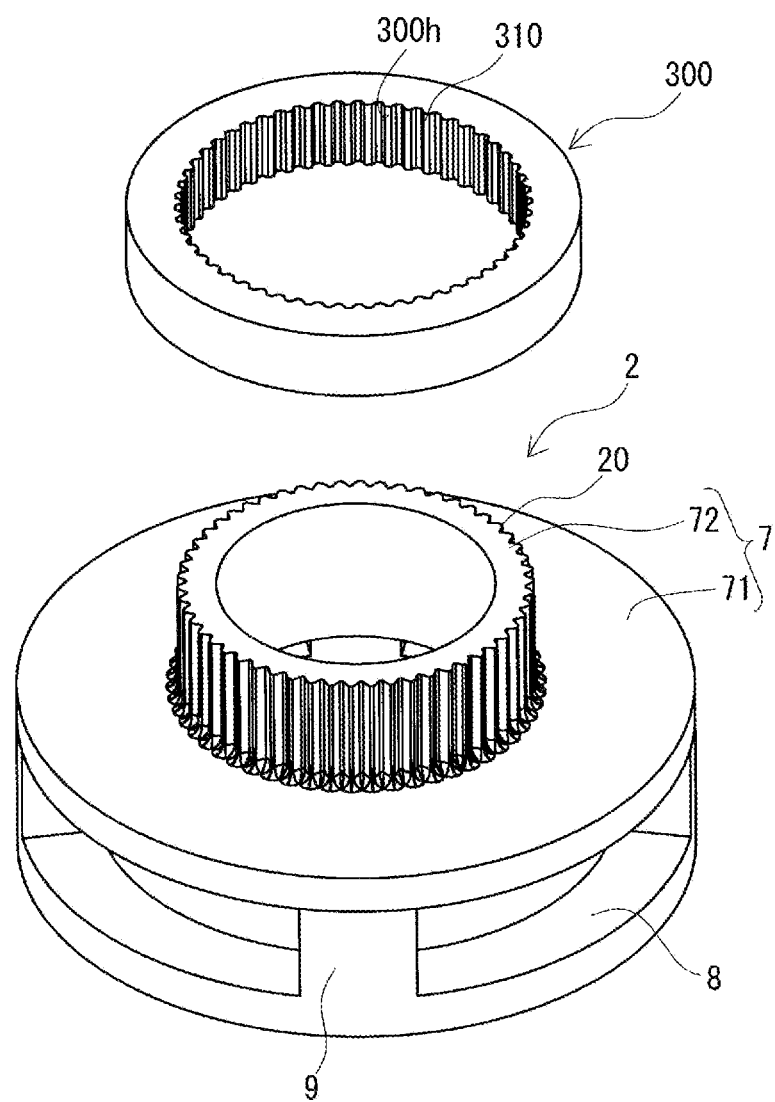
FIG. 1 is a schematic axonometric view illustrating a second gear member of an embodiment.

Problem to be Solved by the Present Disclosures

In order for a gear formed in the boss disclosed in Patent Document 1 to engage another member, the top lands may be machined such as to come in contact with the bottom lands of such another member. In the following, a planetary carrier including the boss will be referred to as a gear member, and the gear formed in the boss will be referred to as teeth. Further, another member which engages the gear formed in the boss will be referred to as a mating member.

The teeth after being machined are preferably in a shape such that the opposite edges of a top land do not come in contact with the tooth surfaces of the mating member when the teeth engage the mating member. Namely, sufficient clearance is present between the opposite edges of a top land of a tooth and the tooth surfaces of the mating member when the teeth engage the mating member. In order to provide the noted clearance, a machining process may be applied to the top land of the tooth, and, then, the opposite edges of the top land are further machined such as to stay clear. In this case, two machining processes need to be applied to the teeth, which results in a more complex manufacturing process.

It is one of the objects of the present disclosures to provide a gear member that has a simple configurations and excels in productivity.

Advantage of the Present Disclosures

The first gear member and the second gear member of the present disclosures have a simple configuration and excel in productivity.

Description of Embodiments of the Present Disclosures

In the following, the details of embodiments of the present disclosures will be listed and described.

(1) A first gear member according to an embodiment of the present disclosures includes
  a tooth having a tooth surface whose profile is an involute curve,
  wherein in a cross-section of the tooth perpendicular to a face width direction,
  the tooth has a depression, near a top land, hollowed in the tooth surface relative to the involute curve.

In the present specification, the gear member refers to a member that is utilized to transmit drive and that has teeth for engaging a mating member. Gear members indeed include a member having teeth over the entire perimeter of an outer circumference or an inner circumference of an annular member, and also include a member having teeth over a portion of the perimeter of an outer circumference or an inner circumference of an annular member, as well as a member having teeth arranged in a straight line.

In the first gear member, the face width direction of a tooth is the direction perpendicular to both the tooth depth direction and the direction in which the teeth are arrayed. A cross-section of the tooth perpendicular to the face width direction is a plane parallel to each side face of the tooth. In the case in which the first gear member is a ring gear such as an external gear or an internal gear, for example, the above-noted cross-section is a plane perpendicular to the axis of the ring gear. In the case in which the first gear member is a straight-line gear such as a rack, the above-noted cross-section is a plane that contains both the tooth depth direction and the direction in which the teeth are arrayed.

The first gear member is a member whose tooth top lands have not yet been machined. The first gear member that has not yet been machined has a depression in the tooth surface near a top land. The tooth top lands of the first gear member are machined such as to come in contact with the bottom lands of the mating member. In so doing, a machining process may be performed to leave part of a hollowed portion of the depression, so that the opposite edges of a top land are shaped such as to avoid contact with the tooth surfaces of the mating member. Specifically, the tooth that has been machined can have a second edge which is further inside in a tooth thickness direction than a first edge that is imaginary and constituted by the involute curve and a surface extension of a top land, With the provision of the second edges of the tooth, sufficient clearance is provided between the opposite edges of the top land of the tooth and the tooth surfaces of the mating member when the tooth engages the mating member. Applying a single machining process to the first gear member of the present disclosures enables the manufacturing of a gear member having a tooth top land that can come in contact with a bottom land of the mating member and that has edges providing sufficient clearance between the edges and the tooth surfaces of the mating member. According to the first gear member of the present disclosures, the provision of depressions around the opposite edges of a tooth top land alone serves to reduce the number of performed machining processes to one from two in the related art. The first gear member of the present disclosures thus has a simple configuration and excels in productivity.

(2) One aspect of the first gear member according to the embodiment of the present disclosures may be, for example, a configuration in which
the depression has a round bottom surface, and
a radius of curvature of the bottom surface is greater than or equal to 0.1 mm and less than or equal to 0.8 mm.

The radius of curvature of the bottom surface of the depression contributes to the hollowed shape of the depression. With the radius of curvature of the bottom surface of the depression being less than or equal to 0.8 mm, the depression is easily provided with a deep hollow. By providing the depression with a deep hollow, the tooth having undergone a machining process is readily provided with the edges that ensure sufficient clearance between the edges and the tooth surfaces of the mating member. With the radius of curvature of the bottom surface of the depression being too small, the hollow of the depression ends up having a sharp angle, which makes it difficult to manufacture a gear member. By providing the radius of curvature of the bottom surface of the depression greater than or equal to 0.1 mm, thus, the manufacturability of a gear member can be improved.

(3) One aspect of the first gear member according to the embodiment of the present disclosures may be, for example, a configuration in which
the depression has a recess boundary situated toward the top land, and
a portion connecting the recess boundary and the top land is rounded,
a radius of curvature of the rounded portion being greater than or equal to 0.1 mm and less than or equal to 1.0 mm.

The radius of curvature of the portion connecting the top land and the recess boundary of the depression situated toward the top land contributes to the shape and size of the tooth top land. With the radius of curvature of the portion being greater than or equal to 0.1 mm, the top land is provided with a necessary tooth thickness. By providing the top land with the necessary tooth thickness, the manufacturability of the gear member can be easily improved. When the gear member is made of a sintered body, for example, the provision of a necessary tooth thickness at the top land easily ensures that the top land is sufficiently injected with the powder for making a gear member. As was previously described, the tooth top lands of the first gear member are machined. Accordingly, the radius of curvature of the portion connecting a top land and the recess boundary of a depression situated toward the top land also contributes to the shape and size of the tooth top land after being machined. With the radius of curvature of the portion being greater than or equal to 0.1 mm, the top land is easily provided with a necessary tooth thickness after the teeth are machined. The greater the radius of curvature of the portion is, the greater the machining allowance of the first gear member is. With the radius of curvature of the portion being less than or equal to 1.0 mm, thus, an excessive increase in the machining allowance of the first gear member can be reduced.

(4) One aspect of the first gear member according to the embodiment of the present disclosures may be, for example, a configuration in which
the tooth thickness of the top land is greater than or equal to 0.4 mm.

By providing the top land with the tooth thickness greater than or equal to 0.4 mm, the manufacturability of the gear member can be easily improved. When the gear member is made of a sintered body, for example, the provision of a tooth thickness greater than or equal to 0.4 mm at the top land can ensure that the top land is sufficiently injected with the powder for making a gear member.

5) A second gear member according to an embodiment of the present disclosures includes
a tooth having a tooth surface whose profile is an involute curve,
wherein the tooth has a second edge which is further inside in a tooth thickness direction than a first edge that is imaginary and constituted by the involute curve and a surface extension of a top land,
wherein the top land is a processed surface that has been machined, and
wherein the tooth surface is an unprocessed surface that has not been machined.

The second gear member is a member obtained by machining the tooth top lands of the first gear member. It follows that the top land of the second gear member is comprised of a processed surface that has been machined. The second gear member has the second edge on the tooth. The second edge is made by machining the tooth top land of the first gear member to remove a portion at the tip end of the tooth. It follows that the tooth surfaces of the second gear member are comprised of an unprocessed surface. Here, the processed surface refers to a surface that has been machined by cutting, grinding, polishing, etc. The unprocessed surface refers to a surface in the state existing prior to the application of any machining process. The processed surface has machining process marks in accordance with the type of machining process. In contrast, the unprocessed surface does not have machining process marks, and has the surface conditions of the member obtained by a manufacturing process immediately preceding the machining process. For example, the gear member may be made of a sintered body, and the machining process may be a cutting process. In such a case, the processed surface is a cut surface having cutting process marks, and the unprocessed surface is a sintered surface having a burnt covering made by sintering. In this manner, the processed surface and the unprocessed surface can easily be distinguished.

The second edge is further inside in the tooth thickness direction than the first edge that is imaginary and constituted by the involute curve and a surface extension of the top land. The second gear member of the present disclosures can thus be configured such that sufficient clearance is provided between the opposite edges of the top land of the tooth and the tooth surfaces of the mating member when the tooth engages the mating member. The second gear member is obtained by machining the tooth top lands of the first gear member as was previously described. The second gear member of the present disclosures thus has a simple configuration and excels in productivity.

(6) One aspect of the second gear member according to the embodiment of the present disclosures may be, for example, a configuration in which the tooth thickness of the top land is greater than or equal to 0.4 mm.

By providing the top land with the tooth thickness greater than or equal to 0.4 mm, the top land can easily come in contact with the bottom land of the mating member.

Details of Embodiments of the Present Disclosures

In the following, the details of the embodiments of the present disclosures will be described with reference to the drawings. In the drawings, the same reference numbers or characters represent elements having the same names.

Outline

Gear members of the embodiment will be described by taking a planetary carrier as an example. The gear members of the embodiment include a first gear member 1 and a second gear member 2. The second gear member 2 will be described with reference to FIG. 1 to FIG. 4, and the first gear member 1 will be described mainly with reference to FIG. 5. The second gear member 2 includes a plurality of teeth 20 as shown in FIG. 1. The first gear member 1 includes a plurality of teeth 10 similarly to the second gear member 2. The second gear member 2 is a member obtained by machining the top land 12 of each tooth 10 of the first gear member 1. Namely, the first gear member 1 is a member serving as a basis of the second gear member 2, and is a member that has the teeth 10 with the top lands 12 having not yet been machined. The first gear member 1 and the second gear member 2 differ in whether or not the top lands 12 and 22 of the teeth 10 and 20 are machined. Further, the first gear member 1 and the second gear member 2 differ in the shape of portions, near the top lands 12 and 22, of the tooth surfaces 11 and 21 of the teeth 10 and 20. In the following, the common configurations of the first gear member 1 and the second gear member 2 will be described first, and, then, the respective specific configurations of the first gear member 1 and the second gear member 2 will be described.

<Common Configuration>

The configurations of the first gear member 1 and the second gear member 2 are mostly shared by both, except for the top lands 12 and 22 of the teeth 10 and 20 and the portions, near the top lands 12 and 22, of the tooth surfaces 11 and 21. The common configurations of the first gear member 1 and the second gear member 2 will be described with reference to FIG. 1, which illustrates the second gear member 2.

The first gear member 1 and the second gear member 2 in this example are a planetary carrier, which includes a first plate 7, a second plate 8, and a connection 9. The first plate 7 includes a flange 71 and a boss 72. The flange 71 is comprised of a disc-shaped member. The boss 72 is comprised of a cylindrical member. The boss 72 is integrally formed with the flange 71 around a through hole at the center. The through hole in the flange 71 and the through hole in the boss 72 are continuous. A shaft (not shown) engaging with a sun gear extends through the through hole in the flange 71 and the through hole in the boss 72. The outer perimeter surface of the boss 72 of the first gear member 1 has the teeth 10 shown in FIG. 5. The outer perimeter surface of the boss 72 of the second gear member 2 has the teeth 20 shown in FIG. 4. The boss 72 of the second gear member 2 is engaged with a mating member 300 as will be described later. The mating member 300 includes a through hole 300h through which the boss 72 extends, and has a plurality of teeth 310 on the inner perimeter surface of the through hole 300h. The first gear member 1 is a member serving as a basis of the second gear member 2, and is not engaged with the mating member 300. The second plate 8 is positioned in an opposing relationship to the surface of the first plate 7 opposite from the boss 72. The second plate 8 is comprised of a disc-shaped member. The shaft engaging with a sun gear extends through the center through hole in the second plate 8. The connection 9 connects the first plate 7 and the second plate 8.

<First Gear Member>

Figure 5:
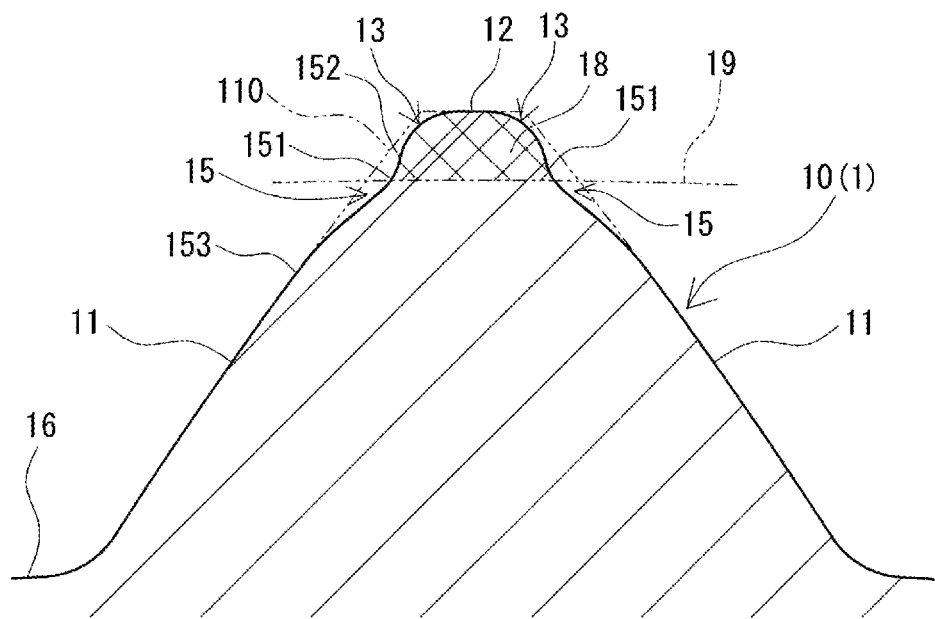
FIG. 5 is an enlarged cross-sectional view illustrating a tooth provided in a first gear member of the embodiment.

As shown in FIG. 5, the first gear member 1 includes a machining allowance 18, to which a machining process is applied, at the top land 12 of the tooth 10. In FIG. 5, the machining allowance 18 is shown in cross hatched lines. This machining allowance 18 is removed to obtain the second gear member 2 shown in FIG. 2.

Figure 6:
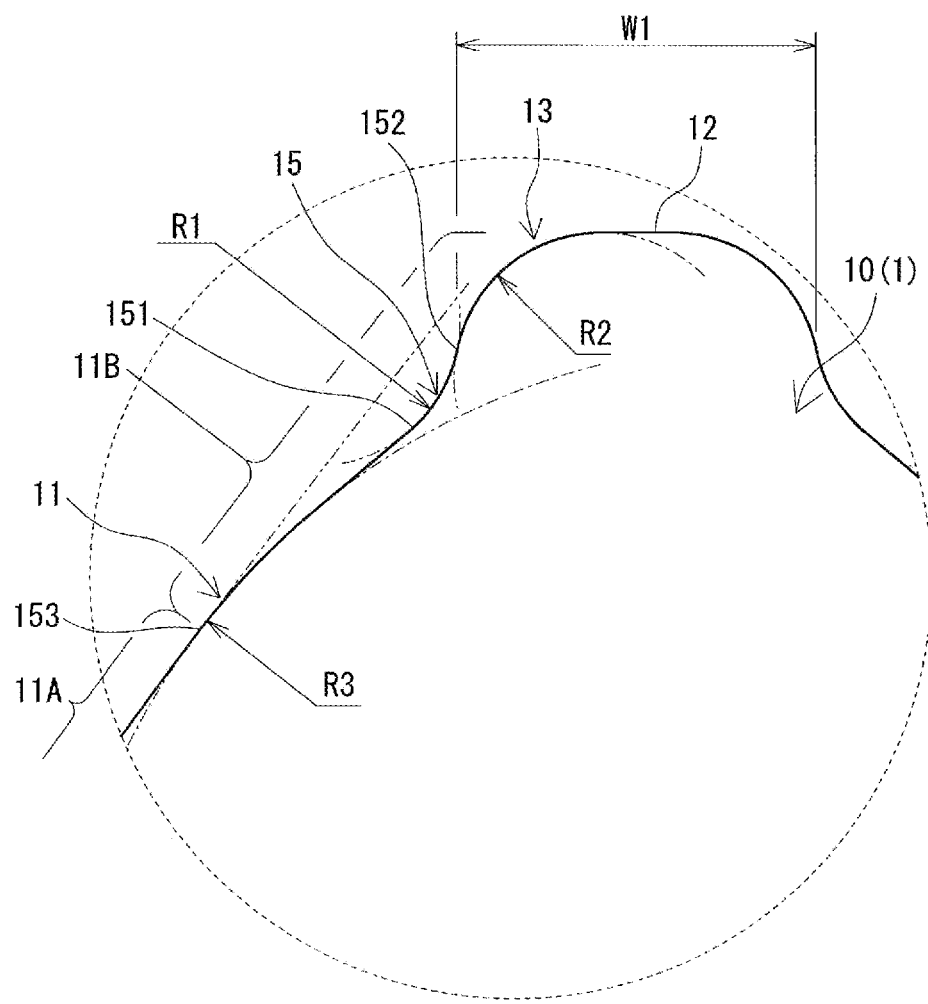
FIG. 6 is an illustrative drawing illustrating the dimensions of the tooth provided in the first gear member of the embodiment.

The first gear member 1 has the teeth 10. Although FIG. 5 shows one tooth 10, the other teeth 10 have the same configuration. The tooth 10 has a tooth surface 11 whose profile is an involute curve 110. In FIG. 5, part of the involute curve 110 is shown in a dash double dot line. Specifically, the tooth surface 11 has a first region 11A and a second region 11B as shown in FIG. 6. The first region 11A is a region on the same side as a bottom land 16, and is comprised of the involute curve 110. The second region 11B is a region on the same side as the top land 12. One of the features of the first gear member 1 is that the second region 11B includes a depression 15 in a cross-section perpendicular to the face width direction of the tooth 10. The depression 15 is hollowed relative to the involute curve 110. The tooth 10 has a bilaterally symmetrical shape with a line of symmetry at the center in the tooth thickness direction.

<<Bottom Surface of Depression>>

The depression 15 has a round bottom surface 151 as shown in FIG. 6. The bottom surface 151 includes an area having the deepest hollow relative to the involute curve 110.

Figure 3:
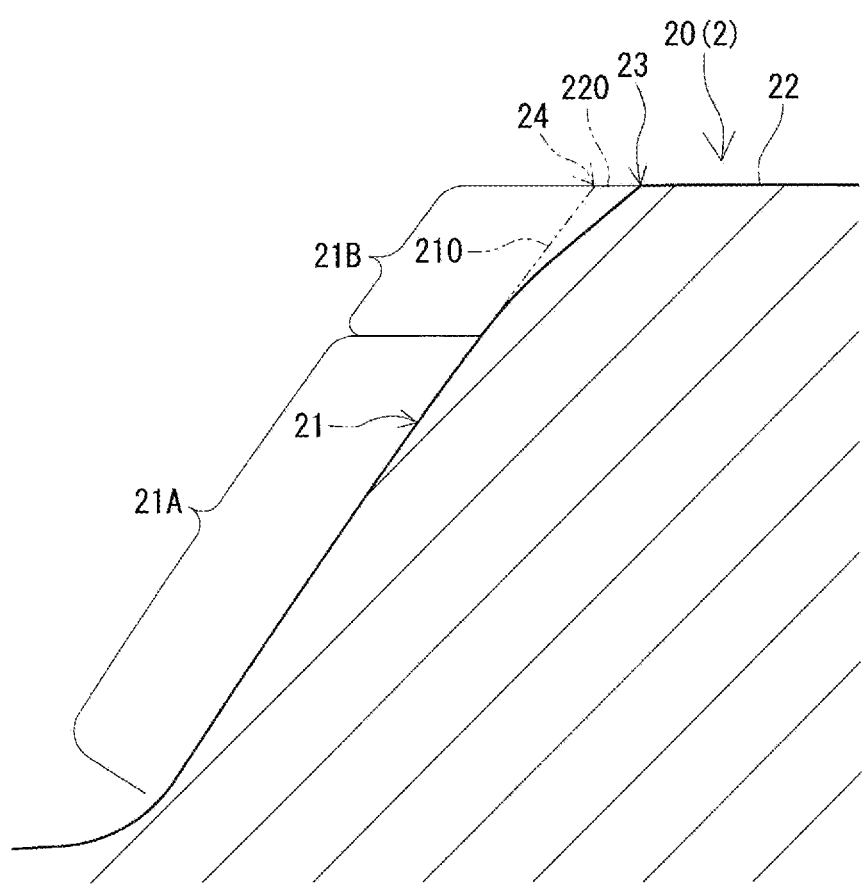
FIG. 3 is an enlarged cross-sectional view illustrating the tooth tip of the tooth provided in the second gear member of the embodiment.

The first gear member 1 is configured such that the top lands 12 of the teeth 10 are machined. In so doing, a machining process is performed to leave part of a hollowed portion of the depression 15. Accordingly, since the bottom surface 151 of the depression 15 is rounded, the tooth surface 21 near the edge 23 of the second gear member 2 obtained by machining is easily given a smooth surface as shown in FIG. 3.

Figure 2:
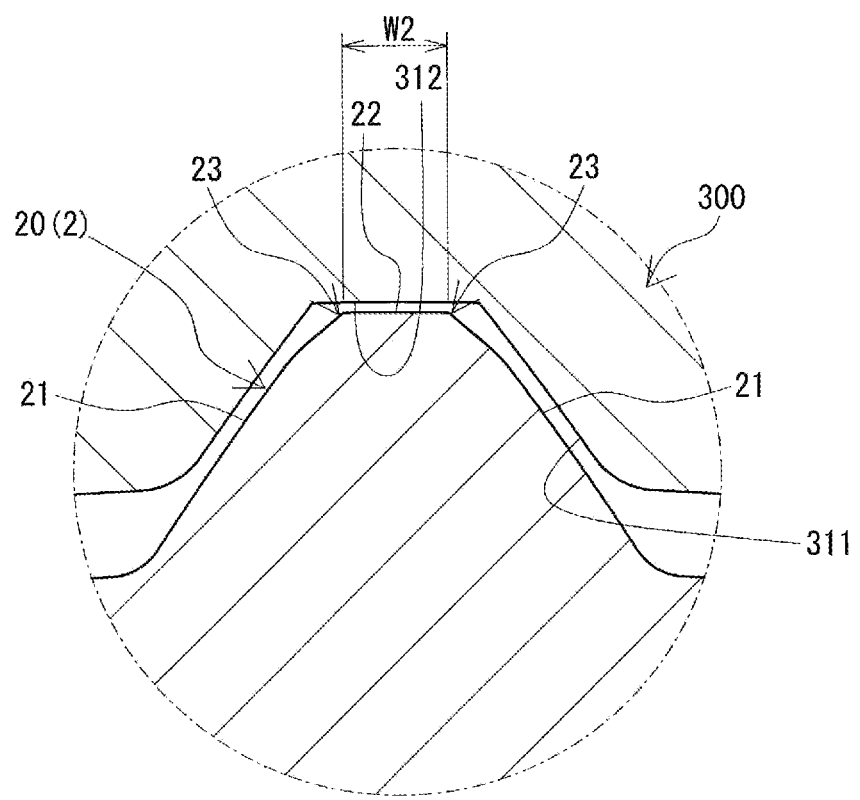
FIG. 2 is an enlarged cross-sectional view illustrating a tooth provided in the second gear member of the embodiment.

As shown in FIG. 6, a radius R1 of curvature of the bottom surface 151 of the depression 15 is the radius of curvature of the curve constituting the bottom surface 151 of the depression 15 in a cross-section perpendicular to the face width direction. The radius R1 of curvature of the bottom surface 151 of the depression 15 may be greater than or equal to 0.1 mm and less than or equal to 0.8 mm. The radius R1 of curvature of the bottom surface 151 contributes to the hollowed shape of the depression 15. With the radius R1 of curvature of the bottom surface 151 being less than or equal to 0.8 mm, the depression 15 is easily provided with a deep hollow. By providing the depression 15 with a deep hollow, the tooth 20 of the second gear member 2 shown in FIG. 2 is readily provided with the edges 23 that ensure sufficient clearance between the edges 23 and the tooth surfaces 311 of the mating member 300. With the radius R1 of curvature of the bottom surface 151 being too small, the hollow of the depression 15 ends up having a sharp angle, which makes it difficult to manufacture the first gear member 1. By providing the radius R1 of curvature of the bottom surface 151 greater than or equal to 0.1 mm, thus, the manufacturability of the first gear member 1 can be improved. The radius R1 of curvature of the bottom surface 151 of the depression 15 may preferably be greater than or equal to 0.1 mm and less than or equal to 0.5 mm, and may further preferably be greater than or equal to 0.1 mm and less than or equal to 0.3 mm.

<<Recess Boundary of Depression>>

The depression 15 has a recess boundary 152 situated toward the top land 12, and a recess boundary 153 situated toward the bottom land 16. The recess boundary 152 situated toward the top land 12 is an inflection point at which the curve constituting the bottom surface 151 changes from a concave to a convex. The recess boundary 153 situated toward the bottom land 16 is the inflection point between the first region 11A and the second region 11B. Namely, the recess boundary 153 situated toward the bottom land 16 is the inflection point between the involute curve 110 of the first region 11A and the line constituting the depression 15.

[Recess Boundary toward Top Land]

The portion connecting the top land 12 and the recess boundary 152 of the depression 15 situated toward the top land 12 is rounded. The portion connecting the top land 12 and the recess boundary 152 situated toward the top land 12 constitute opposite edges 13 of the top land 12. Since the portion connecting the top land 12 and the recess boundary 152 situated toward the top land 12 is rounded, the edges 13 can easily be given a smooth surface.

As shown in FIG. 6, a radius R2 of curvature of the portion connecting the top land 12 and the recess boundary 152 situated toward the top land 12 is the radius of curvature of the curve connecting the top land 12 and the curve constituting the bottom surface 151 in a cross-section perpendicular to the face width direction. The radius R2 of curvature of the portion connecting the top land 12 and the recess boundary 152 situated toward the top land 12 may be greater than or equal to 0.1 mm and less than or equal to 1.0 mm. The radius R2 of curvature of the portion connecting the top land 12 and the recess boundary 152 situated toward the top land 12 contributes to the shape and size of the top land 12 of the tooth 10. With the radius R2 of curvature of the portion connecting the top land 12 and the recess boundary 152 situated toward the top land 12 being greater than or equal to 0.1 mm, the top land 12 is provided with a necessary tooth thickness. By providing the top land 12 with the necessary tooth thickness, the manufacturability of the first gear member 1 can be easily improved. When the first gear member 1 is made of a sintered body, for example, the provision of a necessary tooth thickness at the top land 12 easily ensures that the top land 12 is sufficiently injected with the powder for making the first gear member 1. The radius R2 of curvature of the portion connecting the top land 12 and the recess boundary 152 situated toward the top land 12 also contributes to the shape and size of the top land 22 of the tooth 20 of the second gear member 2 that is shown in FIG. 2 and obtained by machining. With the radius R2 of curvature of the portion connecting the top land 12 and the recess boundary 152 situated toward the top land 12 being greater than or equal to 0.1 mm, the top land 22 of the tooth 20 of the second gear member 2 shown in FIG. 2 and obtained by machining is provided with a necessary tooth thickness. The greater the radius R2 (FIG. 6) of curvature of the portion connecting the top land 12 and the recess boundary 152 situated toward the top land 12 is, the greater the machining allowance 18 (FIG. 5) of the first gear member 1 is. With the radius R2 of curvature of the portion connecting the top land 12 and the recess boundary 152 situated toward the top land 12 being less than or equal to 1.0 mm, thus, an excessive increase in the machining allowance 18 of the first gear member 1 can be reduced. The radius R2 of curvature of the portion connecting the top land 12 and the recess boundary 152 situated toward the top land 12 may preferably be greater than or equal to 0.1 mm and less than or equal to 0.5 mm.

[Recess Boundary toward Bottom Land]

The portion connecting the involute curve 110 of the first region 11A and the recess boundary 153 of the depression 15 situated toward the bottom land 16 is rounded. Since the portion connecting the involute curve 110 of the first region 11A and the recess boundary 153 situated toward the bottom land 16 is rounded, the depression 15 can easily be formed.

A radius R3 of curvature of the portion connecting the involute curve 110 of the first region 11A and the recess boundary 153 situated toward the bottom land 16 is the radius of curvature of the curve connecting the involute curve 110 and the bottom surface 151 of the depression 15 in a cross-section perpendicular to the face width direction. The radius R3 of curvature of the portion connecting the involute curve 110 of the first region 11A and the recess boundary 153 situated toward the bottom land 16 may be greater than or equal to 0.3 mm and less than or equal to 2.0 mm. Since the radius R3 of curvature of the portion connecting the involute curve 110 of the first region 11A and the recess boundary 153 situated toward the bottom land 16 is greater than or equal to 0.3 mm, the tooth surface 11 connecting the involute curve 110 of the first region 11A and the bottom surface 151 of the depression 15 can easily be given a smooth surface. Further, since the radius R3 of curvature of the portion connecting the involute curve 110 of the first region 11A and the recess boundary 153 situated toward the bottom land 16 is less than or equal to 2.0 mm, a necessary involute spline can be provided. The radius R3 of curvature of the portion connecting the involute curve 110 of the first region 11A and the recess boundary 153 situated toward the bottom land 16 may preferably be greater than or equal to 0.5 mm and less than or equal to 1.5 mm, and may more preferably be greater than or equal to 0.9 mm and less than or equal to 1.1 mm.

[Tooth Thickness]

The tooth 10 has the depressions 15. As a result, the second region 11B has a smaller tooth thickness than when configured with the involute curve 110, as shown in FIG. 6. Here, a tooth thickness W1 at the top land 12 is the length of a straight-line segment connecting the recess boundaries 152 situated toward the top land 12 as shown in FIG. 6. The tooth thickness W1 of the top land 12 may be greater than or equal to 0.4 mm. By providing the top land 12 with the tooth thickness W1 greater than or equal to 0.4 mm, the manufacturability of the first gear member 1 can be easily improved. When the first gear member 1 is made of a sintered body, for example, the provision of a tooth thickness W1 greater than or equal to 0.4 mm at the top land 12 can ensure that the top land 12 is sufficiently injected with the powder for making the first gear member 1. The tooth thickness W1 of the top land 12 may preferably be less than or equal to 1.5 mm, and more preferably less than or equal to 1.0 mm. Namely, the tooth thickness W1 of the top land 12 may preferably be greater than or equal to 0.4 mm and less than or equal to 1.5 mm, and more preferably greater than or equal to 0.4 mm and less than or equal to 1.0 mm.

<Second Gear Member>

The second gear member 2 has the teeth 20 as shown in FIG. 1. Each of the teeth 20 has the tooth surface 21 whose profile is an involute curve 210 as shown in FIG. 2 and FIG. 3. Although FIG. 2 shows one tooth 20, the other teeth 20 have the same configuration. The tooth 20 has a bilaterally symmetrical shape with a line of symmetry at the center in the tooth thickness direction.

The plurality of teeth 20 of the second gear member 2 engage the teeth 310 of the mating member 300 shown in FIG. 1 and FIG. 2. The top lands 22 of the teeth 20 of the second gear member 2 come in contact with the bottom lands 312 of the mating member 300. In FIG. 2, for the sake of convenience of illustration, the top lands 22 of the teeth 20 of the second gear member 2 do not come in contact with the bottom lands 312 of the mating member 300. By bringing the top lands 22 of the teeth 20 of the second gear member 2 in contact with the bottom lands 312 of the mating member 300, the position of the second gear member 2 is adjusted. For example, when the second gear member 2 is a ring gear, the axis of the second gear member 2 is aligned. Gear members may vary in dimensional tolerances associated with molding. In consideration of this, the first gear member 1 provided with the machining allowance 18 is machined to form the second gear member 2. Examples of machining include cutting, grinding, polishing, etc.

The second gear member 2 is a member obtained by machining the top land 12 of each tooth 10 of the first gear member 1 previously described. Specifically, the second gear member 2 is a member obtained by applying a machining process to the teeth 10 of the first gear member 1 at a machining limit boundary 19 illustrated in FIG. 5 thereby to remove the machining allowance 18. The second gear member 2 has the edges 23 on the tooth 10 as shown in FIG. 2 and FIG. 3. The edges 23 are made by removing the machining allowance 18 of the first gear member 1. With the above-noted arrangement, one of the features of the second gear member 2 is the configuration in which the top land 22 is a processed surface, and the tooth surfaces 21 are an unprocessed surface. Here, the processed surface refers to a surface that has been machined by cutting, grinding, polishing, etc. The unprocessed surface refers to a surface in the state existing prior to the application of any machining process. For example, the first gear member 1 may be made of a sintered body, and the machining process may be a cutting process. In such a case, the top land 22 is a cut surface, and the tooth surfaces 21 are a sintered surface. Further, as shown in FIG. 3, one of the features of the second gear member 2 is the configuration in which the opposite edges 23 of the top land 22 are further inside than imaginary edges 24 in the tooth thickness direction. The imaginary edge 24 is an imaginary first edge constituted by the involute curve 210 and a surface extension 220 of the top land 22. The inside in the tooth thickness direction is the side toward the center line of each tooth 20 in the tooth thickness direction. The outside in the tooth thickness direction is the side away from the center line of each tooth 20 in the tooth thickness direction.

The tooth surface 21 has a first region 21A and a second region 21B. The first region 21A is comprised of the involute curve 210. The second region 21B is further inside than the involute curve 210 in the tooth thickness direction. The second region 21B is comprised of a portion of the hollowed part of the depression 15 in the first gear member 1. Accordingly, when the tooth 20 of the second gear member 2 engages the mating member 300, the distance between the second region 21B and a tooth surface 311 of the mating member 300 is greater than the distance between the first region 21A and the tooth surface 311 of the mating member 300. The second region 21B is continuous to the top land 22. The opposite edges 23 of the top land 22 are further inside than the imaginary edges 24 in the tooth thickness direction. Accordingly, when the tooth 20 of the second gear member 2 engages the mating member 300, sufficient clearance is provided between the opposite edges 23 of the top land 22 and the mating member 300 as shown in FIG. 2.

A tip end of the tooth 20 at the top land 22 has a smaller tooth thickness than when configured with the involute curve 210 shown in FIG. 3. Here, a tooth thickness W2 at the top land 22 is the length of a straight-line segment connecting the opposite edges 23 of the top land 22 as shown in FIG. 2. The tooth thickness W2 of the top land 22 may be greater than or equal to 0.4 mm. By having the tooth thickness W2 greater than or equal to 0.4 mm, the top land 22 can easily come in contact with the bottom land 312 of the mating member 300. The tooth thickness W2 of the top land 22 may preferably be less than or equal to 1.5 mm, and more preferably less than or equal to 1.0 mm. Namely, the tooth thickness W2 of the top land 22 may preferably be greater than or equal to 0.4 mm and less than or equal to 1.5 mm, and more preferably greater than or equal to 0.4 mm and less than or equal to 1.0 mm.

Figure 4:
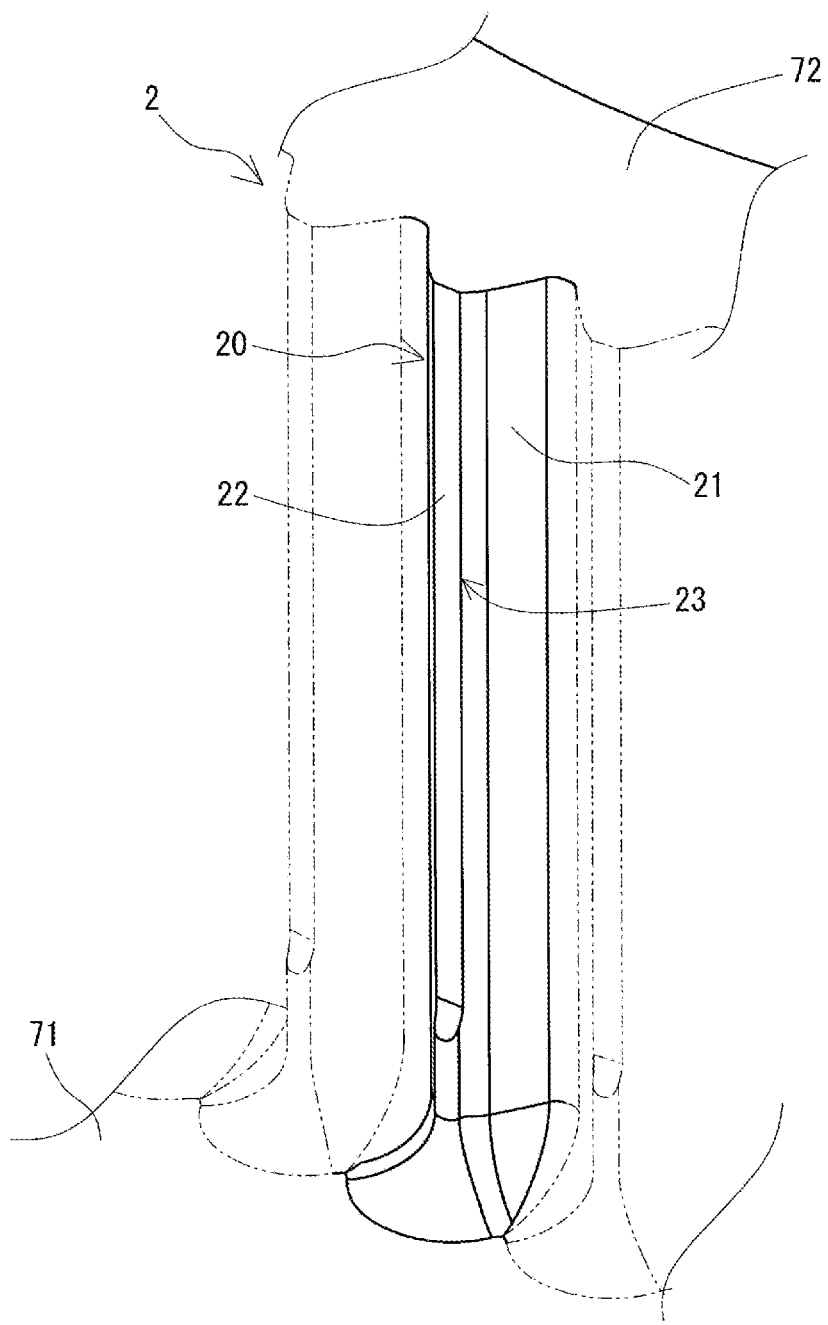
FIG. 4 is an enlarged axonometric view illustrating the tooth provided in the second gear member of the embodiment.

In this example, as shown in FIG. 4, the top land 22, of the portion of the tooth 20 near the flange 71, is not machined. The top land 22, of the portion of the tooth 20 near the flange 71, is thus an unprocessed surface. The portion of the tooth 20 having the top land 22 of an unprocessed surface is not engaged with the mating member 300.

<Function and Effect>

The second gear member 2 shown in FIG. 2 and FIG. 3 is obtained by machining the top land 12 of each tooth 10 of the first gear member 1 shown in FIG. 5. As shown in FIG. 5, the first gear member 1 has the depressions 15 in the tooth surfaces 11 near the opposite edges 13 of the top land 12 of the tooth 10. In consideration of this, the machining allowance 18 is set such as to leave part of a hollowed portion of each depression 15. The second gear member 2 obtained by machining this machining allowance 18 is provided with, as shown in FIG. 3, the edge 23 and the second region 21B that are further inside than the involute curve 210 in the tooth thickness direction. That is, a single machining process applied to the first gear member 1 shown in FIG. 5 can produce the second gear member 2 shown in FIG. 2. Specifically, applying a single machining process to the first gear member 1 enables the manufacturing of the second gear member 2 having the top land 22 of the tooth 20 that can come in contact with the bottom land 312 of the mating member 300 and that has the edges 23 providing sufficient clearance between the edges 23 and the tooth surfaces 311 of the mating member 300.

The present disclosures are not limited to those examples, and are intended to include any variations and modifications which may be made without departing from the scope of the claims and from the scope warranted for equivalents of the claimed scope.

The configuration of the teeth 10 of the first gear member 1 described above and the configuration of the teeth 20 of the second gear member 2 can be applied to the teeth of various types of gear. Specifically, such gears include spur gears, helical gears, internal gears, racks, bevel gears, elliptical gears, sector gears, and the like.

The first gear member 1 and the second gear member 2 described heretofore may be made of a sintered member obtained by heating and compacting iron-based metal powder, a melt-grown material based on iron-based metal, a rubber material, or a resin material.

DESCRIPTION OF REFERENCE SYMBOLS 1 first gear member
10 tooth
11 tooth surface, 11A first region, 11B second region
110 involute curve
12 top land
13 edge
15 depression, 151 bottom surface, 152, 153 recess boundary
16 bottom land
18 machining allowance, 19 machining limit boundary
2 second gear member
20 tooth
21 tooth surface, 21A first region, 21B second region
210 involute curve
22 top land, 220 surface extension
23 edge, 24 imaginary edge
7 first plate, 71 flange, 72 boss
8 second plate
9 connection
300 mating member, 300h through hole
310 tooth, 311 tooth surface, 312 bottom land
R1, R2, R3 radius of curvature
W1, W2 tooth thickness

The invention claimed is:

1. A gear member comprising:
a tooth having a tooth surface, a portion of which has a profile that is an involute curve,
wherein in a cross-section of the tooth perpendicular to a face width direction,
the tooth has a depression, near a top land of the tooth, hollowed in the tooth surface relative to the involute curve, the depression being disposed closer to the top land than to a bottom land.

2. The gear member as claimed in claim 1, wherein the depression has a round bottom surface, and
a radius of curvature of the bottom surface is greater than or equal to 0.1 mm and less than or equal to 0.8 mm.

3. The gear member as claimed in claim 1, wherein the depression has a recess boundary situated toward the top land, and
a portion connecting the recess boundary and the top land is rounded,
a radius of curvature of the rounded portion being greater than or equal to 0.1 mm and less than or equal to 1.0 mm.

4. The gear member as claimed in claim 1, wherein a tooth thickness of the top land is greater than or equal to 0.4 mm.

5. The gear member as claimed in claim 2, wherein the depression has a recess boundary situated toward the top land, and
a portion connecting the recess boundary and the top land is rounded,
a radius of curvature of the rounded portion being greater than or equal to 0.1 mm and less than or equal to 1.0 mm.

6. The gear member as claimed in claim 3, wherein a tooth thickness of the top land is greater than or equal to 0.4 mm.

7. A gear member comprising:
a tooth having a tooth surface whose profile is partially an involute curve,
wherein the tooth has a second edge which is further inside in a tooth thickness direction than a first edge that is imaginary and constituted by the involute curve and a surface extension of a top land,
wherein the top land is a surface that has cutting process marks, and
wherein the tooth surface is entirely a sintered surface having a burnt covering.

8. The gear member as claimed in claim 7, wherein a tooth thickness of the top land is greater than or equal to 0.4 mm.

* * * * *